(12) United States Patent
Wellach et al.

(10) Patent No.: US 8,128,809 B2
(45) Date of Patent: Mar. 6, 2012

(54) RING OPENING PROCESS

(75) Inventors: Stephan Wellach, Laudenbach (DE);
Knut Grande, Trondheim (NO); Jorunn Steinsland Rosvoll, Ranheim (NO); Per Aksel Skjolsvik, Flatasen (NO); Gotz Burgfels, Bad Aibling (DE); Josef Schonlinner, Obing (DE); Friedrich Schmidt, Rosenheim (DE); Volker Kurth, Bad Aibling (DE)

(73) Assignee: Statoil ASA, Stavanger (NO)

( * ) Notice: Subject to any disclaimer, the term of this patent is extended or adjusted under 35 U.S.C. 154(b) by 538 days.

(21) Appl. No.: 11/989,070

(22) PCT Filed: Oct. 27, 2006

(86) PCT No.: PCT/EP2006/010371
§ 371 (c)(1),
(2), (4) Date: Mar. 9, 2009

(87) PCT Pub. No.: WO2007/048627
PCT Pub. Date: May 3, 2007

(65) Prior Publication Data
US 2009/0200202 A1   Aug. 13, 2009

(30) Foreign Application Priority Data

Oct. 27, 2005 (EP) .................................... 05023544
Oct. 26, 2006 (WO) ................. PCT/EP2006/010351

(51) Int. Cl.
*C10G 35/095* (2006.01)

(52) U.S. Cl. ......... 208/217; 52/67; 208/208 R; 208/211; 208/216 R

(58) Field of Classification Search .............. 208/208 R, 208/211, 216 R, 217; 502/67
See application file for complete search history.

(56) References Cited

U.S. PATENT DOCUMENTS

| | | | |
|---|---|---|---|
| 3,830,724 A * | 8/1974 | Schutt | ....................... 208/111.15 |
| 4,137,152 A | 1/1979 | Chester et al. | |
| 4,305,808 A | 12/1981 | Bowes et al. | |
| 4,696,732 A | 9/1987 | Angevine et al. | |
| 4,802,971 A | 2/1989 | Herbst et al. | |
| 4,921,595 A | 5/1990 | Gruia | |
| 4,983,273 A | 1/1991 | Kennedy et al. | |

(Continued)

FOREIGN PATENT DOCUMENTS

EP     0101177     *   7/1983

(Continued)

OTHER PUBLICATIONS

Schlenker et al., "The Framework Topology of ZSM-48, A High Silica Zeolite," *Zeolites*, 5:355-358 (1985).

*Primary Examiner* — Robert J Hill, Jr.
*Assistant Examiner* — Brian McCaig
(74) *Attorney, Agent, or Firm* — Ballard Spahr LLP

(57) ABSTRACT

A single stage process for desulfurization and ring opening of a sulphur containing hydrocarbon feedstock comprising:
contacting said feedstock with hydrogen and a catalyst at a pressure of less than 100 bars wherein said catalyst comprises
(I) a combination of molecular sieves consisting of at least one zeolite which has a faujasite structure and at least one fibrous zeolite which comprises essentially non-crossing one-dimensional channels and
(II) a composition comprising at least one metal selected from group VIB of the periodic table and at least one metal from group VIII.

26 Claims, 7 Drawing Sheets

U.S. PATENT DOCUMENTS

| | | | |
|---|---|---|---|
| 4,985,134 A | | 1/1991 | Derr, Jr. et al. |
| 5,208,197 A | | 5/1993 | Vassilakis et al. |
| 5,290,744 A | * | 3/1994 | Degnan, Jr. et al. ............ 502/67 |
| 5,308,475 A | | 5/1994 | Degnan et al. |
| 5,500,109 A | | 3/1996 | Keville et al. |
| 5,611,912 A | | 3/1997 | Han et al. |
| 5,762,902 A | | 6/1998 | Benazzi et al. |
| 5,800,698 A | | 9/1998 | Tejada et al. |
| 5,928,498 A | | 7/1999 | McVicker et al. |
| 5,993,642 A | * | 11/1999 | Mohr et al. ..................... 208/46 |
| 6,531,054 B1 | | 3/2003 | Gerritsen et al. |
| 2004/0232047 A1 | | 11/2004 | Benazzi et al. |

FOREIGN PATENT DOCUMENTS

| | | |
|---|---|---|
| EP | 0 703003 A1 | 3/1996 |
| EP | 1336649 A1 | 8/2003 |
| WO | WO 93/21284 | 10/1993 |
| WO | WO 98/56878 | 12/1998 |
| WO | WO 99/22577 | 5/1999 |
| WO | WO 00/77129 A1 | 12/2000 |
| WO | WO 2005/051535 A1 | 6/2005 |

* cited by examiner

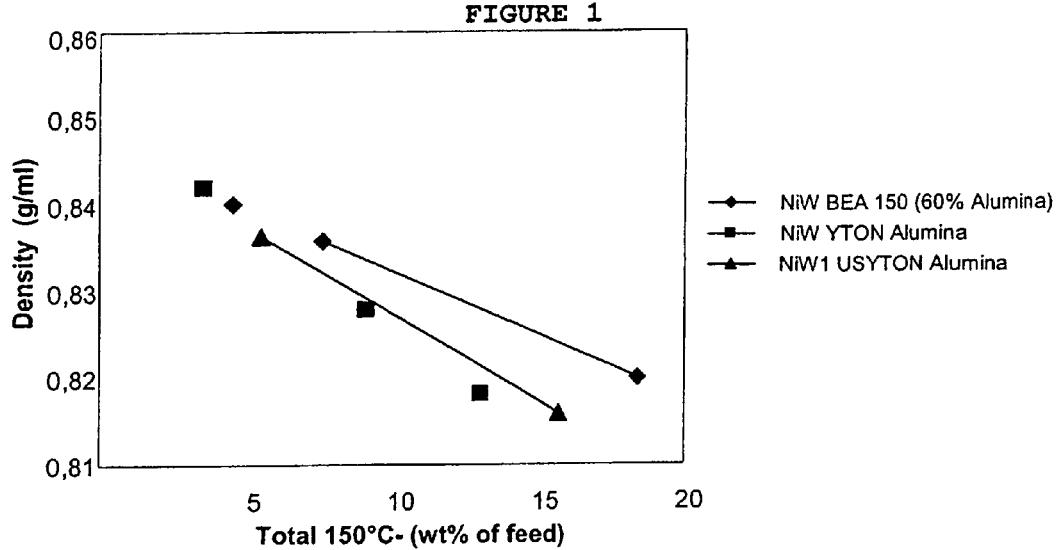
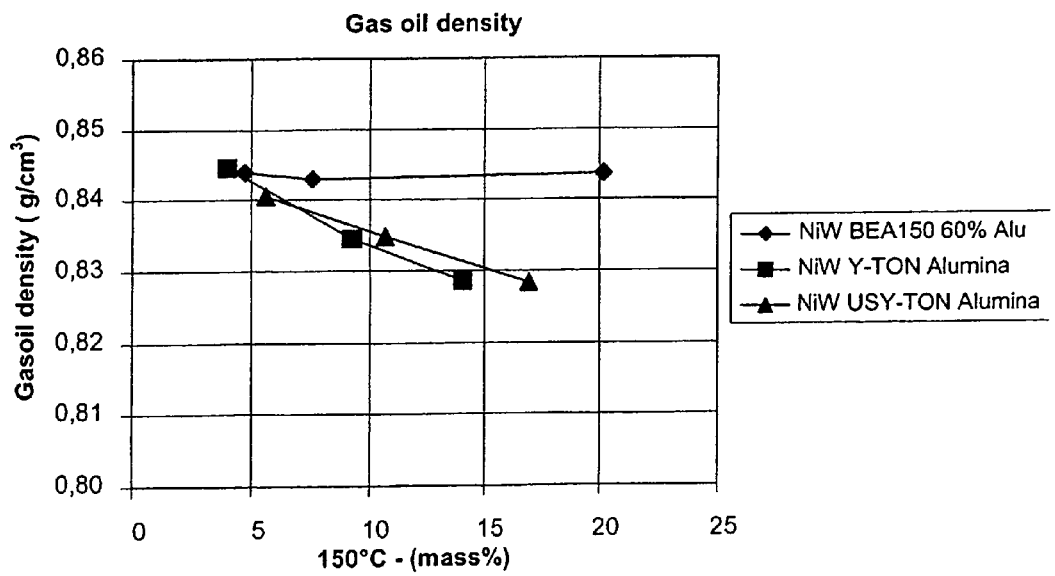

RING OPENING PROCESS

CROSS-REFERENCE TO RELATED APPLICATIONS

The present application is a National Phase Application of International Application No. PCT/EP2006/010371, filed Oct. 27, 2006, which claims priority to European Patent Application No. 05023544.9, filed Oct. 27, 2005, and International Patent Application No. PCT/EP2006/010351, filed Oct. 26, 2006, which applications are incorporated herein fully by this reference.

The present invention relates to a process for the selective ring opening of hydrocarbon feedstocks, in particular sulphur containing hydrocarbon feedstocks, into a form suitable for use in automotive diesel. The process is also suitable for the upgrading of distillates, e.g. from thermal or catalytic cracking.

Crude oil is composed of a variety of hydrocarbons which are separated and put to a wide variety of uses. The light and heavy gas oils of crude oil are often used in the manufacture of heating oils and automotive diesel. It is well known, however, that the gas oils need to be refined before they can be used. It is known that the light and heavy gas oils contain high levels of sulphur (e.g. 0.1 to 1% wt) which need to be reduced before the gas oil can be employed as a fuel in order to meet emissions requirements.

Moreover, the cetane number of the fuel needs to be adjusted such that it is in a suitable range. In Europe for example, in order to meet stringent emissions requirements, diesel must have a cetane number of at least 51. Typically, straight run distillates from naphthenic and heavy crude oils tend to have cetane numbers as low as 40, with cracked distillates having significantly lower cetane numbers. The gas oils obtained from crude oil generally comprise paraffins, naphthenes and aromatic compounds. Whilst the paraffins and naphthenes are generally suitable for use in diesel directly, the aromatic compounds in the gas oil have very low cetane ratings (e.g. less than 30) making the gas oil unsuitable for use in diesel directly.

It is therefore essential to be able to convert the aromatic compounds present in the gas oil into higher cetane number compounds, i.e. paraffins and naphthenes. This is achieved by conventional hydrocracking as is well known. It is essential also that some of the aromatic components are converted to paraffins. Naphthenes themselves offer cetane numbers of 40 to 70. Higher molecular weight molecules with one long side chain have high cetane numbers; lower molecular weight molecules with short side chains have low cetane numbers. Thus a cracked feedstock even with a very high content in naphthenes may not have a high enough cetane number to be used directly as a diesel fuel. It is therefore necessary to ring open aromatic and/or naphthenic components of a hydrocarbon feedstock.

However, care must be taken during a hydrocracking process not to crack the aromatic compounds (and other hydrocarbons which will be present, i.e. the naphthenes and paraffins) into naphtha and gases, i.e. into low boiling point hydrocarbon components. The components of diesel should have boiling points in the range from 150 to 360° C. If a process to convert the aromatic portion of the gas oil results in hydrogenation, ring opening and chain cracking, large amounts of naphtha components having a too low boiling point might result.

The problem faced by the petroleum chemist is that linear or branched hydrocarbons are generally more susceptible to cracking than cyclic aliphatic hydrocarbons. Thus, to ring open a cyclic aliphatic hydrocarbon without then cracking the formed linear chain is a challenge. The person skilled in the art is therefore searching for ways in which the aromatic compounds in the gas oil fraction can be hydrogenated and ring opened without being cracked into smaller chains.

Conversion of aromatics into a more desirable diesel fraction typically occurs in a conventional hydrocracking process operating at high pressures. Conventional hydrocracking is a well known process and typically involves a preliminary hydrotreating step prior to the actual hydrocracking reaction. Usually, the catalyst system used in hydrocracking needs very pure starting distillate oils, especially due to the high sulphur content thereof. Therefore, a pre-treatment of these distillates is required so that they are present in the required purity. This is achieved using a hydrotreating catalyst which treats the feed to the hydrocracker. Hydrotreating catalysts based on Co, Ni, Mo and W are well known.

Catalyst systems based on zeolites are often used in conventional hydrocracking. Zeolites are three-dimensional (tecto-) silicates which are also called molecular sieves. Zeolites have a porous three-dimensional structure comprising linked oxygen tetrahedra arranged around a cation. A precise definition of zeolites according to the International Mineralogical Association is to be found in: D. S. Coombs et al., The Canadian Mineralogist, vol. 35, p. 1571-1606 (1997).

Proposals to avoid the aforementioned problem have been discussed for a long time, as for example in U.S. Pat. No. 4,305,808. The disadvantage of the catalyst systems based on zeolites in prior art, especially if they are used for hydrocarbon transformations, consists in that an increased formation of products with a very low boiling point of <150° C. is observed. Some zeolites with large pores, as zeolite Beta, have a very strong paraffin-selectivity when used for a mixture of aromatic compounds and paraffin. Aromatic compounds remain in the starting distillate oils (feedstock) and after such a transformation, usually paraffins and low boiling products are obtained (U.S. Pat. No. 4,983,273).

Further, zeolites like zeolite Y show an increased selectivity towards aromatic compounds, which, compared with paraffins, are preferably transformed. This has the effect that the amount of paraffins increases (EP 703003 B1). A disadvantage of this zeolite system is that they have a very low long term stability due to the formation of coke.

A combination of zeolite Y with zeolite Beta was described in U.S. Pat. No. 5,208,197, however, zeolite Beta (BEA) has a very high paraffin selectivity.

The use of a mixture of hydrotreating catalysts and a zeolite mild hydrocracking catalyst is not new. WO93/21284 describes a system where both the hydrotreating catalyst and the cracking catalyst are particulate and are of substantially the same size. The hydrotreating catalyst is a typical Ni—Mo catalyst with the cracking catalyst being a Y-zeolite.

WO98/56876 also describes a bifunctional catalyst for use in high grade diesel fuel production which comprises a hydrotreating catalyst and a zeolite. Beta-zeolites in combination with Co—Mo or Ni—Mo are mentioned.

U.S. Pat. No. 5,500,109 describes a USY zeolite and a Ni—W hydrotreating catalyst to produce cracked hydrocarbons. U.S. Pat. No. 5,208,197 describes the combination of a steam-stabilized form of zeolite Y, known in the art as Y-85, and a form of zeolite beta which has been modified to maximize the weak acid sites and minimize the strong acid sites. It is said to be an effective acidic component of a hydrocracking catalyst for the production of gasoline.

In addition to the problem of naphtha and gas formation, many hydrocracking processes described in the art involve pretreatment of the feed. It would be very useful if such a separate pretreatment (typically to remove sulphur) could be avoided thus allowing the whole hydrocracking process to occur in a single, "one pot", step. The problem underlying the present invention was therefore, in a first aspect, to provide a catalyst composition which, when used in a one step ring opening process under mild conditions, can transform different qualities of distilled oils, which contain paraffins, naphthenes and aromatic compounds as well as sulphur compounds into final products, which can be used as diesel.

This problem is solved by the process as herein defined in which a catalyst composition, comprising a combination of molecular sieves consisting of at least one zeolite which has a faujasite structure and at least one fibrous zeolite which comprises essentially non-crossing one-dimensional channels as well as a hydrotreating catalyst can be used, at low pressure, to effect a one step desulphurisation, hydrogenation and ring opening reaction.

SUMMARY OF INVENTION

Thus, viewed from one aspect the invention provides a single stage process for hydrodesulphurisation and ring opening of a sulphur containing hydrocarbon feedstock comprising:
contacting said feedstock with hydrogen and a catalyst at a pressure of less than 100 barg wherein said catalyst comprises:
(I) a combination of molecular sieves consisting of at least one zeolite which has a faujasite structure and at least one fibrous zeolite which comprises essentially non-crossing one-dimensional channels; and
(II) a composition comprising at least one metal selected from group VIB of the periodic table and at least one metal from group VIII.

The present invention therefore relates to a process carried out in a single stage in which a feedstock which contains sulphur and aromatic compounds is contacted with hydrogen and the above mentioned catalyst system to cause desulphurisation of the feedstock and hydrogenation and subsequent ring opening of aromatic compounds in the feedstock. The ring opening reaction is preferably one which is selective, i.e. ring opening occurs without subsequent cracking of the ring opened product or without concurrent cracking of any paraffins in the feedstock.

It has been surprisingly found that the mixture of zeolite catalysts of the aforementioned particular structure is able to selectively convert the aromatic components of a hydrocarbon feed into paraffins and naphthenes with minimal naphtha production. Moreover, it is able to do this even with a sulphurous containing feedstock at low pressures.

Thus, the process of the invention is capable of desulphurisation, hydrogenation and hydrocracking in a single step.

The catalyst used in the process hereinbefore described is ideally suited for the purpose. The use of the fibrous zeolite with a one-dimensional channel structure provides an advantageous product distribution as well as increased catalyst stability. A rapid deactivation, as is for example observed with a zeolite Y of prior art, is avoided by the combination according to the invention with a second zeolite having a structure with one-dimensional channels. Furthermore, coke precursors can be avoided or are rapidly reacted.

In a preferred embodiment, the zeolite with a faujasite structure and/or the fibrous zeolite are at least partly present in the so called H-form. It has been found that when the acidity of the zeolite is increased, the yield of the conversion of cyclic to non-cyclic paraffins is increased during the hydrocracking process. The acidity, however, must be carefully controlled since too much acidity may cause coking, reduced cracking selectivity and catalyst deactivation.

Thus, whilst, both the zeolite of the faujasite structure and the fibrous zeolite can be in the H-form, preferably, only the faujasite (or Y) zeolite is modified and is preferably at least partly, or completely, in the so-called H form or partly, or completely in the ammonium form. It is especially preferable to use a USY zeolite.

The faujasite zeolite may have a Si/Al ratio in the range of 1 to 25.

In another preferred embodiment, only the fibrous zeolite is at least partly, or completely, in the H form. It is further preferred, that the channels of the fibrous zeolites are at least 8-ring-channels, still more preferred at least 10-ring-channels and most preferred at least 12-ring-channels, so that the above described beneficial influence of the fibrous zeolites is further increased. This may increase further the yield of cyclic paraffins into non-cyclic paraffins during the ring opening process.

Preferred fibrous zeolites in the context of the present invention are for example the following, which are designated according to the three-letter-code of the International Zeolite Organisation (for further information see http://www.iza-online.org/:
ABW, AEL, AET, AFI, AFO, AHT, ASV, ATN, ATO, ATV, AWO, AWW, BCT, BIK, CAN, CAS, CFI, CHI, CZP, DON, ESV, EUO, GON, IFR, JBW, LAU, LTL, MAZ, MOR, MTF, MTT, MTW, NPO, OFF, OSI, PAR, PON, RON, RTE, SAS, SFE, SFF, SFH, SFN, SSY, STF, TON, VET, VFI.

Especially preferred zeolites among this group are structures with 10 or 12 ring channels namely AEL, AFI, AFO, AHT, ASV, ATO, CAN, CZP, EUO, GON, IFR, LAU, LTL, MAZ, MOR, MTT, MTW, NPO, OFF, OSI, PAR, PON, RON, SFE, SFF, SSY, STF, TON, VET.

More preferred are structures, whose smallest and largest pore diameter of the 10 and 12 ring channels respectively differ less than 1.3 Å, namely AFI, ASV, ATO, CAN, IFR, LTL, MAZ, MOR, MTT, MTW, NPO, OFF, OSI, PON, RON, SFF, STF, TON, VET.

Still more preferred are structures whose smallest pore diameter is not lower than 4.6 Å namely AFI, ATO, CAN, IFR, LTL, MAZ, MOR, MTW, OFF, OSI, SFF, STF, TON, VET.

With respect to TON structures, TON structures according to the present invention preferably do not comprise Nu-10, THETA-1, KZ-2 and ISI-1. In a further preferred embodiment, the zeolite will not be ZBM-30, ZSM-48, EU-2 or EU-11.

It is understood, that also the isotopic structures of these zeolites are comprised within the scope of the present invention. TON and MTW structures are preferred. Specifically preferred structures are ZSM-22 and ZSM-12, e.g. ZSM-12 (MTW like).

Preferred zeolites with a faujasite structure are for example USY, VUSY, Y, REUY, REY. Most preferred are USY, Y and VUSY. In less preferred embodiments REUSY and REY are used.

This first catalyst composition used in the process of the invention usually contains a binder, so that the first composition according to the invention can be shaped to heat stable shaped bodies. Both zeolite components can be carried on separate binders but it is preferred to employ a single binder to carry both zeolite species. In principle, any binder which is known to a person skilled in the art and is suitable for the intended use can be used, especially aluminum compounds, silicate materials, zirconium compounds, titanium oxide and their mixtures as well as cement, clay, silica. The binder may form up to 70 wt %, e.g. up to 30 wt % of the ring opening catalyst.

It is preferred that the binder is an aluminum compound. Non-limiting examples for an aluminum compound are aluminiumoxides ("alu"), boehmite, pseudo-boehmite and mixtures thereof. The shaping of the catalyst occurs by processes essentially known to an artisan, as for example extrusion, strand pressing, compression moulding, etc.

The weight ratio of zeolite of the faujasite structure type to fibrous zeolite may be in the range 1:10 to 10:1, e.g. 1:5 to 5:1, especially 1:2 to 2:1, e.g. approximately 1:1 (e.g. within 5% of 1:1).

The use in particular of fibrous zeolites having a one-dimensional channel structure results not only in a significantly more advantageous product distribution but also in an improved catalyst stability. Rapid deactivation such as is to be observed, for example, in a zeolite Y of the prior art is prevented by the combination of zeolites having a one-dimensional channel structure and the zeolite of the faujasite structure type. It is envisaged that coke precursors responsible for deactivation may be avoided or reacted rapidly. The long life of the hydrocracking catalyst of the invention is an important advantage.

The catalyst composition according to the invention also contains a second component being a composition comprising at least one metal selected from group VIB of the periodic table and at least one metal from group VIII. This component may act as a catalytic active hydrogenation component, which comprises one or more metal components selected from metals of group VIB of the periodic table, as for example Mo, W and group VIII as Co and Ni. Using this component, the aromatic compounds in the feedstock are removed by hydrogenation. Due to the subsequent ring opening reaction of the hydrogenated aromatic compounds, the cetane number of the feedstock is increased.

This component of the catalyst of use in the invention is selected from metals of group VIB of the periodic table, as for example Mo, W and group VIII as Co and Ni and their compounds, as for example their oxides, sulphates, nitrates, complex compounds and their organic salts. Suitable organic salts are, for example, metal carboxylates like formates, acetates, oxalates, metal alkoholates/acetylacetonates and similar compounds and may also comprise complex compounds.

Especially preferably, this component comprises Ni and W or Ni and Mo compounds. Ni may be provided in its 2+ oxidation state via its nitrate with tungsten being provided via a metatungstate salt, e.g. an ammonium salt.

Instead of Ni, Fe may also be used in still further preferred embodiments. The same applies to Co. Combinations of three metals as Ni—Co—Mo are also preferred.

This component of the catalyst of use in the process of the invention may also be supported as is known in the art, e.g. using an inert support such as alumina, silica or silica alumina.

Preferably, the same material is used for the support of both components of the catalyst Especially preferably, both catalyst components are carried on the same support, i.e. using the same binder. This is especially preferred if ultra light gas oil (ULGO) is to be cracked. It is considered surprising that a successful ring opening process can be carried out when all catalyst components are so intimately carried.

The amount of metal present in the second component of the catalyst may vary within well known limits. Preferably however the amount of Group VIB component may be in the range of 2 to 50 wt %, e.g. 5 to 20 wt %, and the amount of Group VIII component in the range of 1 to 10 wt %, e.g. 3 to 8 wt % based on the weight of the catalyst composition (i.e. based on the total weight of the whole catalyst composition).

Suitable reactor loadings of catalysts therefore include 80:20 to 20:80 wt %, e.g. 70:30 to 30:70 wt % such as 40:60 to 50:50 wt % component (I) to component (II) of the catalyst.

As already mentioned in the foregoing, the aromatic compounds are removed from the distillate oils by hydrogenation. Further, the use of the catalyst of the invention, in particular one containing Ni—W or Ni—Mo components, enables the use of oil feedstocks which have a very high sulphur content. In an especially preferred embodiment, very cheap distillate oils with a sulphur content of up to 3000 ppm can be used. The catalyst composition of use in the process of the invention therefore has a surprisingly high sulphur tolerance. The process also removes nitrogen from the feedstock.

The process of the invention allows transformation of different distillate oils in a single process step to a product which substantially meets specification with regard to density, cetane number and sulphur content of diesel. At the same time, the amount of light products with a boiling point of less than 150° C. is minimized. The fraction with a boiling point of <150° C. is termed in the following as "150° C.". Thus, once the lower boiling point products are removed after the ring opening reaction, the resulting hydrocarbon mixture is one which should be capable of being added directly to diesel without further treatment.

The catalyst composition used in the process of the invention can be made by mixing the zeolite components with a binder and forming the catalyst into an appropriately shaped body. The shaped bodies obtained are dried and calcined. The steps of drying and calcining may be carried out, in particular, as follows:

i) drying of the shaped bodies at a temperature in a range from 100 to 130° C.,
ii) calcining the shaped bodies at a temperature in the range from 400 to 600° C.,
iii) cooling down to room temperature.

In this context, the final step of the calcining preferably furthermore comprises the following steps:

i) heating in intervals of 1-5° C./min from room temperature to a temperature in the range from 280 to 400° C.,
ii) maintaining of the temperature over a period of 10 to 20 h,
iii) heating again in intervals of 1-5° C./min to a temperature in the range from 470 to 530° C.,
iv) subsequent cooling to room temperature.

The intervals in step i) are preferably 1-2° C./min, particularly preferably 1° C./min, and the temperature to be reached is 330 to 360° C., in particular 350° C. This temperature is maintained for 15 to 17 h, preferably for 16 h.

The intervals in step iii) of the process are 1-2° C./min, particularly preferably 1° C./min, and the temperature to be reached is 480 to 520° C., very particularly preferably 510° C.

The calcined catalyst composition can then be treated with a solution, e.g. an aqueous solution, of metal components required to form the second component of the catalyst. The metal components are preferably metal compounds from group VIB and VIII of the periodic table, for example a nickel and a tungsten component as hereinbefore described.

After the step of application of the metal components, the catalyst formation process may furthermore comprises the steps of i) drying of the shaped bodies at a temperature in a range from 100 to 130° C., ii) calcining at a temperature in a range from 400 to 500° C.,
iii) cooling down to room temperature.

This second calcining may further comprise the following specific steps:
i. heating in intervals of 1-5° C./min from room temperature to a temperature in the range from 180 to 220° C.,
ii. maintaining of the temperature over a period of 3 to 6 h,
iii. heating again in intervals of 1-5° C./min to a temperature in the range from 420 to 470° C., followed by subsequent cooling to room temperature.

The hydrocarbon feedstock on which the process above operates can be any suitable feed, e.g. any distillate oil. Preferably however, the feed comprises light and/or heavy gas oils, (especially straight run light or heavy gas oils of crude oil), vacuum distillates, vacuum gas oil, coker gas oil, light cycle oil and materials which are produced during coking, e.g. delayed coking or fluid catalytic cracking. The use of light gas oil or heavy gas oil, especially straight run light gas oil or straight run heavy gas oil is especially preferred.

The boiling point of the hydrocarbon feedstock may be in the range from 150 to 550° C., in particular 250 to 450° C., preferably 280 to 410° C. The density of the hydrocarbon feedstock may be greater than 845 kg/m$^3$, e.g. greater than 870 kg/m$^3$.

The sulphur content of the feedstock may be at least 1500 ppm, preferably at least 2000 ppm, especially at least 2500 ppm (by weight).

The nitrogen content of the feedstock may be at least 150 ppm, preferably at least 200 ppm (by weight).

The feedstock may comprise at least 20% aromatics, e.g. at least 25% aromatics, such as 25 to 70 wt % aromatics, e.g. at least 28 wt % aromatics, such as at least 35% aromatics. The feedstock may comprise up to 20 wt % monoaromatics, up to 10 wt % diaromatics and up to 5 wt % triaromatics.

The process of the invention can be carried out in a conventional hydrotreating process layout. FIG. 12 shows an exemplary process set up. The process occurs in a single step, i.e. hydrogenation, desulphurisation and ring opening of the feedstock all occur in the same reaction step. The process does not therefore involve further cracking steps or the like. The whole process occurs in a single reactor preferably under constant conditions. One of the advantages of the invention is that feedstocks which previously required separate pretreatment, e.g. to prevent catalyst poisoning can be used directly in this case without separate pretreatment.

The catalyst system can be present in a single bed or multiple beds. In a further embodiment, the catalyst system of the invention is present in one bed with a hydrotreating catalyst present in a separate, preferably earlier bed from the ring opening catalyst. The person skilled in the art is able to manipulate the reactor set up to suit his needs. Hydrogen is added to the reactor to effect hydrogenation, desulphurisation and ring opening of the feedstock.

An ideal reactor set up may involve addition of the feedstock with hydrogen rich treat gas to the reactor, i.e. it is preferred if addition of the hydrogen and feedstock occur through the same reactor inlet. Whilst it would be possible to feed these separately, mixing them is preferred. In a further preferred embodiment, the feed or feeds to the reactor are preheated, preferably to a temperature similar to that of the reactor at the inlet point. Thus, if the reactor temperature is 350° C. at the inlet point, then the feed should be heated to approximately this temperature prior to its addition to the reactor.

Preheating of the feed can be achieved using an external heat source but ideally it is effected by heat exchange with the reactor effluent stream. Should heat exchange not heat the feed sufficiently, external heating means can be used to supplement the preheating process.

As the reactor feed passes through the reactor and hence over the catalyst in the reactor, it is preferred if the temperature increases through the reactor, i.e. from inlet to outlet. The temperature increase through the reactor may be at least 20° C., e.g. at least 30° C.

Where the reactor contains a plurality of catalyst beds, i.e. the feed passes over more than one catalyst bed between the inlet and reactor outlet, it is possible to cool the reactor between beds by the introduction of a quench gas, typically hydrogen. This not only cools the reactor but provides further hydrogen for hydrogenation.

In one embodiment the reactor contains only a single catalyst bed comprising the catalyst as hereinbefore defined. It is also possible to arrange for the reactor to comprise two or more such beds. In a highly preferred embodiment however the reactor comprises two catalyst beds, the first comprising a hydrotreating catalyst and the second comprising a catalyst composition as required by the process of the invention.

The hydrotreating catalyst used can be one which is conventional in the art, e.g. one based on metals from groups VIB and VIII. Preferred combinations are based on Ni or Co with Mo or W.

Thus, viewed from a further aspect, the invention provides a single stage process for desulfurization and ring opening of a sulphur containing hydrocarbon feedstock which takes place in a reactor having at least two separate catalyst beds, a first bed and a second bed, said first bed comprising a hydrotreating catalyst and said second bed comprising:
(I) a combination of molecular sieves consisting of at least one zeolite which has a faujasite structure and at least one fibrous zeolite which comprises essentially non-crossing one-dimensional channels and
(II) a composition comprising at least one metal selected from group VIB of the periodic table and at least one metal from group VIII;
wherein said feedstock is contacted with hydrogen prior to entry into the reactor and contacts said first catalyst bed then said second catalyst bed, the pressure in the reactor being less than 100 barg.

Moreover, it is preferred if there is no recycling of any part of the ring opened feedstock back into the reactor or transfer of any part of the ring opened feedstock to another reactor in which cracking would occur.

Once the desulphurisation, hydrogenation and ring opening have occurred the reactor effluent may be cooled and mixed with wash water before further cooling, e.g. by air cooler or other heat exchange, to the required separator temperature. In the separator sour water, reacted feedstock and gas may be separated. Sour water may routed back to the sour water system, the gas (hydrogen) may be recycled to the reactor and the reacted feedstock is sent to a product stripper where light products, such as hydrocarbon gases and naphtha, are sent overhead and the gasoil product is taken out as the bottom product.

The gas is typically sent to $H_2S$ recovery, the naphtha to further processing or to product tankage, and the gasoil product is sent to product tankage for subsequent use in diesel fuel.

The process of the invention is carried out under particularly mild conditions and this is a further aspect of the invention. In particular low pressures can be employed. Low pressures mean a more economic process and are highly desirable. The process of the invention preferably occurs at a temperature of from 250 to 500° C., preferably 300 to 450° C., especially 350 to 400° C. The pressure is less than 100 barg but preferably at least 10 barg, e.g. 50 to 100 barg, such as 60 to 100 barg e.g. 70 to 80 barg. Barg is gauge pressure, i.e. the pressure measured in bars on a pressure gauge (thus relative to the ambient pressure).

Suitable hydrogen to feedstock ratios may be at least 75 Nl/l, e.g. 100 to 1500 Nl/l, preferably 500 to 1000 Nl/l. (The unit Nl/l represents normal liter hydrogen at 0° C. and 1 atm pressure per liter feedstock). The liquid hourly space velocity (LHSV) may be between 0.3 to 5/h, e.g. 0.5 to 2/h, such as 0.5 to 1.5/h, especially less than 1/h.

The catalyst can be regenerated by conventional techniques, e.g. by burning off any coke which forms on the catalyst composition.

The product of the process as hereinbefore defined has a much lowered sulphur content relative to the feedstock. Sulphur contents in the hydrocarbon product which exits the ring opening reactor can be less than 50 ppm, e.g. less than 20 ppm, especially less than 10 ppm. The amount of sulphur present in the hydrocarbon product can be reduced further by increasing the operating temperature.

The process to ring open sulphur-containing feedstocks thereby also advantageously avoids the need for prior desulphurization of the feedstock which would otherwise need to be carried out separately.

The ring opening catalyst composition of the invention also effects denitrogenation of the feedstock. Levels of less than 10 ppm in the product can be achieved, e.g. less than 2 ppm. For straight-run HGO as an example, the nitrogen levels in the feedstock may be of the order of 250 ppm which reduces to less than 2 ppm after ring opening.

The combination of large-pored zeolites having a faujasite structure with fibrous zeolites having a 1-dimensional channel structure, such as, for example, TON or MTW, preferably in combination with the second catalyst composition, such as Ni—W, also ensures that the cetane number of the ring opened hydrocarbon feedstock is increased whilst minimizing the content of light products having a boiling point of <150° C.

After the process of the invention, the boiling point of the majority (i.e. at least 50 wt %) of the hydrocarbon product, i.e. the ring opened feedstock, should be in the range from 150 to 360° C., preferably at least 60 wt %. Preferably, at least 90% of the product, especially 95% of the product is formed from hydrocarbons having a boiling point below 395° C., preferably below 380° C., especially below 360° C.

The amount of naphtha component (i.e. liquid components boiling below 150° C.) produced during the process should be less than 40% wt, preferably less than 30% wt, especially less than 15% wt, most especially less than 10 wt % of the ring opened product. Such naphtha can of course be isolated and used as is known in the art.

The amount of hydrocarbon gas produced (i.e. C1-C4 fraction) is also minimised, e.g. to less than 5 wt %. Again, these gaseous products can be isolated and used as is known in the art.

The density reduction achieved using the process of the invention from feedstock to ring opened product is preferably at 25 kg/m³, especially at least 30 kg/m³. This reduction is preferably achieved relative to the formed product even after the naphtha and gas fractions are removed, i.e. the density of the diesel components is at least 25 kg/m³ less than the density of the feedstock.

The density of the hydrocarbon product is preferably less than 845 kg/m³. Whilst the density can be reduced further by increasing the temperature of the process this also results in increased naphtha production.

The amount of monoaromatics in the product stream can be reduced to less than 15 wt %, the amount of diaromatics to less than 2 wt % and the amount of triaromatics to less than 0.5 wt % using the process of the invention, especially for a heavy gas oil feedstock. The total aromatic content may therefore reduced to less than 17.5 wt %.

In addition, the naphthenes content of the product (i.e. cyclic aliphatic hydrocarbon content) may be greater than 45 wt %.

The cetane number of the cracked product is preferably greater than 51, especially greater than 55.

The product can be fractionated or passed to further reactors for further treatment as is desired. It is also possible to recycle heavy fractions back into the hydrocracker. Preferably however, the hydrocarbon product stream, after naphtha and gas removal, is suitable for direct use in automotive diesel.

The invention will now be described with reference to the following non-limiting examples and figures.

FIGURES

In the following, some preferred embodiments are illustrated by way of figures and drawings without being understood as limiting the scope of the invention.

FIG. 1 is a diagram which illustrates the results from comparing catalyst compositions Ni—W/Y-TON and Ni—W/USY-TON according to the invention with regard to Ni—W/BEA-150 upon the reaction with ultra light gas oil (ULGO);

FIG. 2 shows a comparison of the gas oil density in using the catalyst of FIG. 1;

EXAMPLE 1

Figure 3:
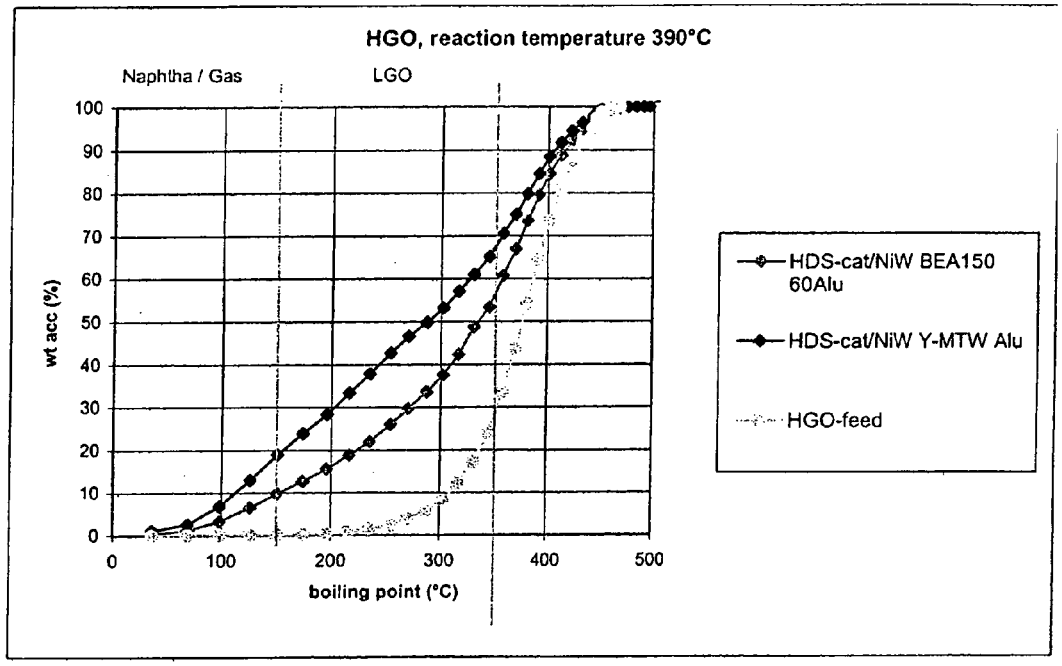
FIG. 3 is a diagram which shows the results of the reaction of the starting material HGO (heavy gas oil) with catalysts according to the invention compared to the catalyst Ni—W/BEA-150 in prior art.

Catalyst According to the Invention Comprising Zeolite USY (Modified Y Zeolite) and Zeolite ZSM-22 (TON Structure Type)

1.1 Preparation of the Support:

Synthesis of the Catalyst Support (CBV760+ZSM-22, 24% $Al_2O_3$) by Extrusion:

153 g of zeolite USY (CBV 760 from Zeolyst) and 170 g of HZSM-22 (from Süd-Chemie) were mixed for 15 min in a kneader with 79.72 g of commercially available pseudoboehmite as a binder and 26.80 g of commercially available α-aluminum dioxide with the addition of 100.78 g of demineralized water, and the mixture was processed to a plastic mass by addition of 29.59 g of concentrated acetic acid and 175 g of demineralized water. The mass was kneaded for a further 10 min and 22.60 g of mould release oil (steatite oil) were then added. The mass was subsequently extruded to shaped bodies (d=1/16"). The shaped bodies were dried in air at 120° C. for 16 h and then calcined in air. For this, the shaped bodies were first heated to 350° C. at a heating rate of 1° C./min and kept at this temperature for 16 h. The temperature was then increased to 510° C. with a heating rate of 1° C./min and the shaped bodies were kept at this temperature for 15 h. The shaped bodies were cooled to room temperature and then comminuted to an average size of 3 mm. The catalyst support had the chemical and physical properties stated in Table 1:

TABLE 1

Chemical and physical properties of Ex 1.1

Ex. No.: 1.1

| Format | | | 1/16" extrudates |
|---|---|---|---|
| Binder | | | $Al_2O_3$ |
| Binder content | | (wt. %) | 24 |
| LOI | | (wt. %) | 3.7 |
| Na | a) | (ppm by wt.) | n. determ. |
| C | a) | (ppm by wt.) | n. determ. |
| CS-AVE | b) | (kp/3 mm) | 1.9 |
| CS-MIN | | (kp/3 mm) | 0.9 |
| CS-MAX | | (kp/3 mm) | 2.8 |
| PV-Hg | d) | ($cm^3$/g) | 0.44 |
| PSD: | | | |
| >1,750 nm | | (wt. %) | 0.89 |
| 1,750-80 nm | | (wt. %) | 9.53 |
| 80-14 nm | | (wt. %) | 73.3 |
| 14-7.5 nm | | (wt. %) | 16.28 |
| BET (Surface Area) | c) | ($m^2$/g) | 361 |

LOI = loss on ignition at 100° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

1.2 Preparation of the Catalyst:

Synthesis of the Ni—W form by the method of incipient wetness to form (Ni—W/CBV760+ZSM-22, 24% $Al_2O_3$)

Ammonium metatungstate was dissolved in ½ the water pore volume of the support, while stirring and heating gently (approx. 40° C.). After the tungstate solution had cooled to room temperature, $Ni(NO_3)_2*6H_2O$ was added and the solution was diluted with water to the pore volume. The solution was added to the support in a plastic vessel, the vessel was then closed and the liquid was distributed homogeneously over the support by shaking. The support was introduced into a porcelain vessel and dried in a drying oven at 120° C. for 16 h and calcined in air in an oven. For this, the shaped bodies were first heated to 200° C. at a heating rate of 1° C./min and kept at this temperature for 5 hours. The temperature was then heated to 450° C. with a heating rate of 1° C./min and the shaped bodies were kept at this temperature for 5 hours and finally cooled again to room temperature.

Amount weighed out: 100 g Ex 1.1 (CBV760+ZSM-22, 24% aluminum dioxide binder, water pore volume=58 ml/100 g extrudates, $LOI_{1,000° C.}$ 3.7%), 27.01 g ammonium metatungstate, 29.82 g $Ni(NO_3)_2*6H_2O$.

TABLE 2

Chemical and physical properties of Ex 1.2:

| | Based on LOI | | Without taking into account LOI |
|---|---|---|---|
| LOI (%) | | | 8.7 |
| Na [ppm] | 80 | a) | 74 +/− 20 |
| Ni (wt. %) | 4.7 | a) | 4.3 +/− 0.3 |
| W (wt. %) | 15.0 | a) | 13.8 +/− 0.5 |
| C [ppm] | 239 | a) | 220 +/− 30 |
| Fe (ppm) | n. determ. | | |
| BET (Surface Area) ($m^2$/g) | 227 | c) | |
| PV Hg ($cm^3$/g) | 0.29 | d) | |
| CS-AVE (kp/3mm) | 4.6 | b) | |
| CS-Min(kp/3 mm) | 2.5 | | |
| CS-Max (kp/3 mm) | 8 | | |
| PSD: (wt. %) | | | |
| >1,750 nm | 0.75 | | |
| 1,750-80 nm | 9.76 | | |
| 80-14 nm | 82.82 | | |
| 14-7.5 nm | 6.41 | | |

LOI: loss on ignition at 600° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

EXAMPLE 2

Catalyst According to the Invention Comprising Zeolite Y and ZSM-22 (TON Structure Type)

2.1 Preparation of the Support:

Synthesis of CBV500+ZSM-22, 24% Aluminum Oxide ($Al_2O_3$) by Extrusion:

128.57 g of zeolite Y (CBV 500 from Zeolyst) and 136.53 g of H-ZSM-22 from Süd-Chemie were mixed for 15 min in a kneader with 68.44 g of commercially available pseudoboehmite as a binder and 21.54 g of commercially available α-aluminum dioxide with the addition of 82.71 g of demineralized water, and the mixture was processed to a plastic mass by addition of 24.99 g of concentrated acetic acid and 165 g of demineralized water. The mass was kneaded for a further 10 min and 18.55 g of mould release oil (steatite oil) were then added. The mass was then extruded to shaped bodies (d=1/16"). The shaped bodies were dried in air at 120° C. for 16 h and then calcined in air. For this, the shaped bodies were first heated to 350° C. at a heating rate of 1° C./min and kept at this temperature for 16 h. The temperature was then increased to 510° C. with a heating rate of 1° C./min and the shaped bodies were kept at this temperature for 15 h. The shaped bodies were cooled to room temperature and then comminuted to an average size of 3 mm. The catalyst support had the chemical and physical properties stated in Table 3.

TABLE 3

Chemical and physical properties of Ex 2.1
Ex No.: 2.1

| Formats | | | 1/16" extrudates |
|---|---|---|---|
| Binder | | | $Al_2O_3$ |
| Binder content | | (wt. %) | 24 |
| LOI | | (wt. %) | 7.9 |
| Na | a) | (ppm by wt.) | n. determ. |
| C | a) | (ppm by wt.) | n. determ. |
| CS-AVE | b) | (kp/3 mm) | 1.9 |
| CS-MIN | | (kp/3 mm) | 1.1 |
| CS-MAX | | (kp/3 mm) | 3.0 |
| PV-Hg | d) | (cm³/g) | 0.48 |
| PSD: | | | |
| >1,750 nm | | (wt. %) | 0.15 |
| 1,750-80 nm | | (wt. %) | 14.56 |
| 80-14 nm | | (wt. %) | 76.37 |
| 14-7.5 nm | | (wt. %) | 8.92 |
| BET (Surface Area) | c) | (m²/g) | 348 |

LOI: loss on ignition at 600° C.
PSD = pore size distribution
a) based on LOI at 1,000° C.
b) crushing strength (CS) of 50 shaped pieces
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

2.2 Preparation of the Catalyst:

Synthesis of the Ni—W Form by the Method of Incipient Wetness to Form (Ni—W/CBV500+ZSM-22, 24% Aluminum Dioxide).

Ammonium metatungstate was dissolved in ½ the water pore volume of the support, while stirring and heating gently (approx. 40° C.). After the tungstate solution had cooled to room temperature, $Ni(NO_3)_2 \cdot 6H_2O$ was added and the solution was diluted with water to the pore volume. The solution was added to the support in a plastic vessel, the vessel was then closed and the liquid was distributed homogeneously over the support by shaking. The support was introduced into a porcelain vessel and dried in a drying oven at 120° C. for 16 h and calcined in air in an oven as in Example 1.

Amount weighed out: 100 g Ex 2.1 [CBV500+ZSM-22, 24% aluminum dioxide, water pore volume=58.1 ml/100 g extrudates, $LOI_{1,000°C.}$ 7.9%], 25.83 g ammonium metatungstate, 28.52 g $Ni(NO_3)_2 \cdot 6H_2O$.

TABLE 4

Chemical and physical properties of Ex 2.2

| | Based Ion LOI | | Without taking into account LOI |
|---|---|---|---|
| LOI (%) | | | 11.4 |
| Na [ppm] | 257 | a) | 240 +/- 30 |
| Ni (wt. %) | 4.7 | a) | 4.2 +/- 0.3 |
| W (wt. %) | 14.8 | a) | 13.3 +/- 0.5 |
| C [ppm] | 334 | a) | 300 +/- 30 |
| Fe (ppm) | n. determ. | | |
| BET (Surface Area) (m²/g) | 224 | c) | |
| PVHg(cm³/g) | 0.32 | d) | |
| CS-AVE(kp/3 mm) | 5.4 | b) | |
| CS-Min(kp/3 mm) | 3.1 | | |
| CS-Max(kp/3 mm) | 8.3 | | |
| PSD: (wt. %) | | | |
| >1,750 nm | 0 | | |
| 1,750-80 nm | 16.58 | | |
| 80-14 nm | 80.72 | | |
| 14-7.5 nm | 2.7 | | |

LOI: loss on ignition at 600° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Mg porosimetry at a maximum pressure of 2000 bar (DIN 66133)

EXAMPLE 3

Catalyst According to the Invention Comprising Zeolite Y and ZSM-12 (MTW Structure Type)

3.1 Preparation of the Support:

Synthesis of (CBV500+ZSM-12, 24% $Al_2O_3$) by Extrusion:

119.36 g of zeolite Y (CBV 500 from Zeolyst) and 127.25 g of H-ZSM-12 (ratio $SiO_2/Al_2O_3$ in the range of 50 to 150, size of crystallites: ≦0.1 µm) were mixed for 15 min in a kneader with 61.40 g of commercially available pseudoboehmite as a binder and 19.95 g of commercially available α-aluminum dioxide with the addition of 76.94 g of demineralized water, and the mixture was processed to a plastic mass by addition of 22.60 g of concentrated acetic acid and 151 g of demineralized water. The mass was kneaded for a further 10 min and 17.26 g of mould release oil (steatite oil) were then added. The mass was then extruded to shaped bodies (d=1/16"). The shaped bodies were dried in air at 120° C. for 16 h and then calcined in air. For this, the shaped bodies were first heated to 350° C. at a heating rate of 1° C./min and kept at this temperature for 16 h. The temperature was then increased to 510° C. with a heating rate of 1° C./min and the shaped bodies were kept at this temperature for 15 h. The shaped bodies were cooled to room temperature and then comminuted to an average size of 3 mm. The catalyst support had the chemical and physical properties stated in Table 5.

TABLE 5

Chemical and physical properties of Ex 3.1
Ex No.: 3.1

| Formats | | | 1/16" extrudates |
|---|---|---|---|
| Binder | | | alumina |
| Binder content | | (wt. %) | 24 |
| LOI | | (wt. %) | 10.3 |
| Na | a) | (ppm by wt.) | n. determ. |
| C | a) | (ppm by wt.) | n. determ. |
| CS-AVE | b) | (kp/3 mm) | 2.3 |
| CS-MIN | | (kp/3 mm) | 1.4 |
| CS-MAX | | (kp/3 mm) | 3.4 |
| PV-Hg | d) | (cm³/g) | 0.43 |
| PSD: | | | |
| >1,750 nm | | (wt. %) | 0.51 |
| 1,750-80 nm | | (wt. %) | 50.37 |
| 80-14 nm | | (wt. %) | 24.24 |
| 14-7.5 nm | | (wt. %) | 24.88 |
| BET (Surface Area) | c) | (m²/g) | 424 |

LOI: loss on ignition at 600° C.
PSD = pore size distribution
a) based on LOI at 1,000° C.
b) crushing strength (CS) of 50 shaped pieces
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

3.2 Preparation of the Catalyst:

Synthesis of the Ni—W Form by the Method of Incipient Wetness to Form (Ni—W/CBV500+ZSM-12, 24% $Al_2O_3$)

Ammonium metatungstate was dissolved in ½ the water pore volume of the support, while stirring and heating gently (approx. 40° C.). After the tungstate solution had cooled to room temperature, $Ni(NO_3)_2 \cdot 6H_2O$ was added and the solution was diluted with water to the pore volume. The solution was added to the support in a plastic vessel, the vessel was then closed and the liquid was distributed homogeneously over the support by shaking. The support was introduced into a porcelain vessel and dried in a drying oven at 120° C. for 16 h and calcined in air in an oven under continuous absorption with the following temperature programme: 1° C./min-200° C./5 h and 1° C./min-450° C./5 h.

Amount weighed out: 100 g Ex 3.1 [CBV500+ZSM-12, 24% aluminum dioxide binder, water pore volume=53 ml/100 g extrudates, $LOI_{1,000° C.}$ 10.3%], 23.80 g ammonium metatungstate, 27.77 g $Ni(NO_3)_2 \cdot 6H_2O$.

TABLE 6

Chemical and physical properties of Ex 3.2

|  | Based on LOI |  | Without taking into account LOI |
|---|---|---|---|
| $LOI_{600° C.}$ (%) |  |  | 9.7 |
| Na [ppm] | 290 | a) | 260 +/− 30 |
| Ni (wt. %) | 4.7 | a) | 4.2 +/− 0.1 |
| W (wt. %) | 14.5 | a) | 13.1 +/− 0.2 |
| C [ppm] | 240 | a) | 220 +/− 30 |
| Fe [ppm] | n. determ. |  |  |
| BET (Surface Area) ($m^2/g$) | 282 | c) |  |
| PV Hg ($cm^3/g$) | 0.29 | d) |  |
| CS-AVE(kp/3 mm) | 4.7 | b) |  |
| CS-Min(kp/3 mm) | 2.8 |  |  |
| CS-Max(kp/3 mm) | 7.0 |  |  |
| PSD: (wt. %) |  |  |  |
| >1,750 nm | 0.07 |  |  |
| 1,750-80 nm | 56.24 |  |  |
| 80-14 nm | 29.03 |  |  |
| 14-7.5 nm | 14.66 |  |  |

LOI = loss on ignition at 100° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

The catalysts according to the invention were tested with the catalysts from the prior art according to the comparison examples.

COMPARATIVE EXAMPLE 1

Preparation of (BEA150, 60% $Al_2O_3$) (Shaped Bodies of Zeolite BEA by Extrusion)

150 g of zeolite H-BEA with $SiO_2/Al_2O_3$=150 were mixed for 15 min in a kneader with 286 g of commercially available pseudoboehmite as a binder, with the addition of 47 g of demineralized water, and the mixture was processed to a plastic mass by addition of 79.4 g of concentrated acetic acid and 250 g of demineralized water. The mass was kneaded for a further 10 min and 10.5 g of mould release oil (steatite oil) were then added. The mass was then extruded to shaped bodies (d=1/16"). The shaped bodies were dried in air at 120° C. for 16 h and then calcined in air. For this, the shaped bodies were heated to 550° C. at a heating rate of 1° C./min and kept at this temperature for 8 h. The shaped bodies were subsequently cooled to room temperature and then comminuted to an average size of 3 mm.

The preparation of the catalyst (Ni—W/BEA150, 60% $Al_2O_3$) was carried out with the support by loading with Ni—W as in the preceding examples.

Amount weighed out: 100 g Comp 1.1 (BEA 150, 60% aluminum dioxide binder, water pore volume=46.3 ml/100 g extrudates, $LOI_{1,000° C.}$ 9.7%), 25.33 g ammonium metatungstate, 27.96 g $Ni(NO_3)_2 \cdot 6H_2O$.

COMPARATIVE EXAMPLE 2

Preparation of Shaped Bodies of Zeolite Y (CBV 500, 24% $Al_2O_3$, Faujasite Structure) by Extrusion 300 g of zeolite Y (CBV 500 of Zeolyst) mixed for 15 m in a kneader with 66.49 g of commercially available pseudoboehmite as binder and 21.52 g of commercially available alpha-alumina with the addition of 93.6 g of demineralised water and the mixture was processed by addition of 24.45 g of concentrated acetic acid and 200 g of demineralised water to a plastic mass. The mass was kneaded for further 10 min and 20.99 g mould release oil (steatite oil) were added. The mass was then extruded to shape the bodies (d=1/16"). The shaped bodies were dried in air at 120° C. for 16 h and then calcined in air. The shaped bodies were heated with a heating rate of 1° C./min to 200° C. and kept for 5 h at this temperature. Subsequently, the temperature was increased with a heating rate of 1° C./min to 520° C. and the shaped bodies were kept for 5 h at this temperature. The shaped bodies were cooled to room temperature and then comminuted to an average size of 3 mm.

The preparation of the catalyst (Ni—W/CBV500, 24% $Al_2O_3$) was carried out with the support by addition of nickel and tungsten as in the foregoing examples:

Amount weight-out: 100 g Comp 2.1 (CBV 500, 24% $Al_2O_3$), water pore volume 46.5 ml/100 g extrudates, $LOI_{1000° C.}$ 20.0%), 22.44 g ammonium metatungstate, 24.77 g $Ni(NO_3)_2 \cdot 6H_2O$.

COMPARATIVE EXAMPLE 3

Preparation of Shaped Bodies from Zeolite Y (Faujasite Structure) and Zeolite BEA (CBV500+BEA150, 24% $Al_2O_3$) by Extrusion 197.37 g of zeolite y (CBV500 of the company Zeolyst) and 210.08 g zeolite H-BEA with $SiO_2/Al_2O_3$=150 were kneaded in a kneader with 102.75 g of commercially available pseudoboehmite as binder and 33.26 g of commercially available alpha-aluminum dioxide under addition of 127.12 demineralised water and further processed to a plastic mass by addition of 37.78 g concentrated acetic acid and 202 g demineralised water. The mass was kneaded for further 10 min and then 28.51 g of mould release oil (steatite oil) was added. The mass was then extruded to shaped bodies (d=1/16"). The shaped bodies were dried in air at 120° C. for 12 h and then calcined in air. The shaped bodies were heated with a heating rate of 1° C./min to 540° C. and kept for 8 h at this temperature. The shaped bodies were cooled to room temperature and then comminuted to an average size of 3 mm.

The preparation of the catalyst (Ni—W/CBV500+BEA150, 24% $Al_2O_3$)) was carried out with the support by addition of Ni—W as in the foregoing examples.

Amount weight-out: 150 g Comp 3.1 (CBV500+BEA150, 24% aluminum dioxide binder, water pore volume=59 ml/100 g extrudates $LOI_{1000° C.}$ 2.3%) 38.89 g ammonium metatungstate (amount of $WO_3$: 89.1%), 45.38 g $Ni(NO_3)_2 \cdot 6H_2O$.

Test Results:

FIG. 1 shows a diagram which represents the results in comparing catalysts according to the invention, namely Ni—W/N-TON and Ni—W/USY-TON with respect to Ni—W/BEA150 upon reaction of the feedstock ULGO (ultralight gas oil).

In the diagram the density of a liquid total product (total liquid density) is represented as a function of the loss of yield (total 150° C.). Only small differences between both catalysts according to the invention, namely Ni—W/Y-TON and Ni—W/USY-TON compared to a catalyst of the comparative example Ni—W/BEA150 was observed, i.e., for all three catalysts a significant decrease in the density of the liquid total product was observed with an increase in temperature and thereby an increasing amount of the naphtha fraction (total 150° C.), which cannot be used as diesel. However, the catalyst Ni—W/BEA150 showed a decrease in density of the liquid total product due to the formation of light products by cracking the side-chains of alkylsubstituted aromatic compounds which influences the density of the liquid total product but not the gas oil density.

FIG. 2 shows a comparison of the gas oil density upon use of the catalysts shown in FIG. 1. In the diagram, the gas oil density is shown as a function of the amount of light naphtha products. As can clearly be seen, the catalysts according to the invention show better results compared to the catalysts of the prior art. The aim of the reaction was a remarkable decrease of the gas oil density to use the starting material (feed) as diesel without forming too many light products (naphtha 150° C.) during the reaction. This was achieved by the use of a catalyst according to the invention, but not with the catalyst of the comparative example. By the combination of the hydrogenation of aromatic compounds and subsequent ring-opening reaction with the catalysts according to the invention, an obvious decrease of a gas oil density was obtained without a considerable increase of the amount of light naphtha.

FIG. 3 is a diagram wherein the results of the reaction of the starting material HGO (heavy gas oil) with catalysts according to the invention Ni—W/Y-MTW compared to the catalysts in prior art Ni—W/BEA-150 (Comparative Example 1) are shown.

The reaction of HGO showed in the case of the catalyst Ni—W/Y-MTW, alu a remarkably higher yield of a product with a boiling point in the range of LGO (light gas oil) (150° C.-350° C./diesel) compared to the catalyst Ni—W/BEA150, 60% alumina. (In HGO reactions, a further HDS (hydrodesulphurization) catalyst is used up stream of the catalyst.)

Figure 4:
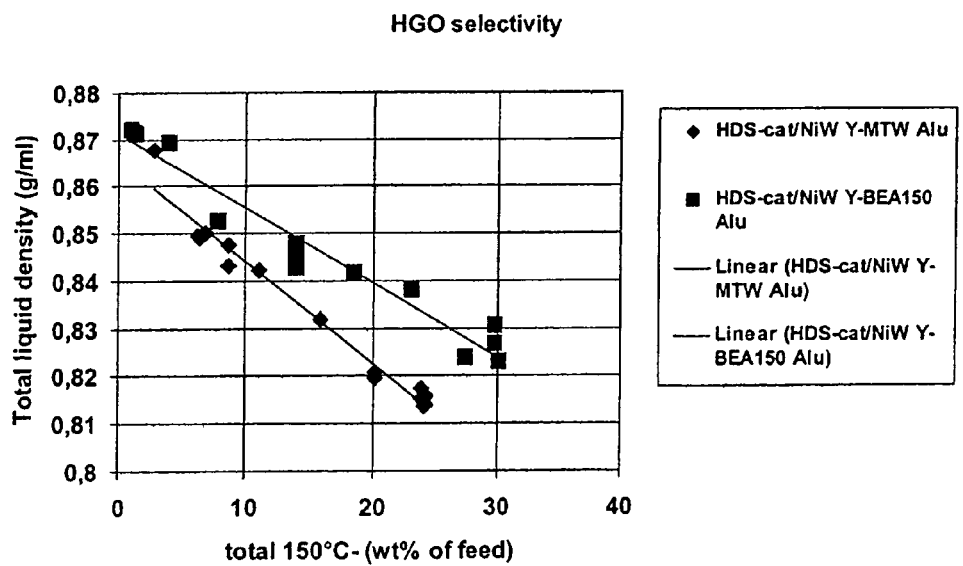
FIG. 4 is a diagram which shows the reaction of the starting material HGO (heavy gas oil) upon using a catalyst according to the invention compared to a catalyst Ni—W/Y-BEA-150.

FIG. 4 shows a diagram, which represents the reaction of the starting material HGO (heavy gas oil) in using a catalyst according to the invention compared to the catalyst Ni—W/Y-BEA150, wherein the density of the liquid total product is shown as a function of the amount of lighter naphtha products. The reduction of the density of the liquid total product should only be the result of an aromatic saturation and not the result of the formation of naphtha, since naphtha as well as gas would result in a loss in the yield of diesel and consumption of hydrogen without an improvement in the cetane number. Therefore, a minimum value of the density of the liquid total product together with a minimum of naphtha and gas is the result which is desired most.

The diagram shows a maximum reduction of the density of the liquid total product (HGO density 0.8867 g/ml) combined with a minimum value of the yield of naphtha/gas for the catalyst HDS-cat/Ni—W/N-MTW, alu. The catalyst HDS-cat/Ni—W/Y-BEA150, alu is less selective for the transformation of HGO with an increasingly higher loss in the yield with the same decrease in the density of the liquid total product.

Figure 5:
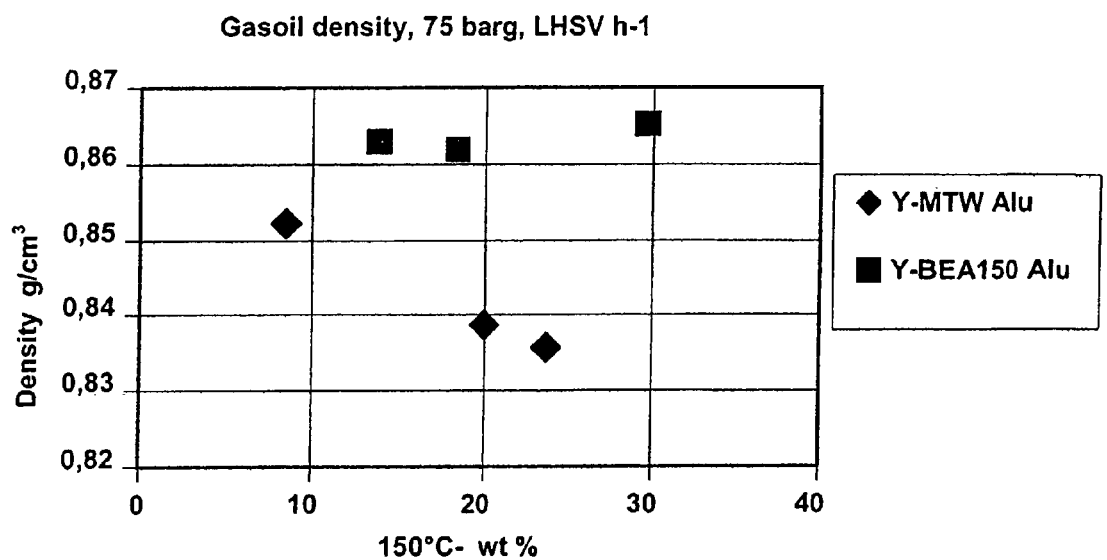
FIG. 5 is a diagram where the gas oil density is shown as a function of the yield of naphtha and gas (Gew % 150° C.) of a catalyst according to the invention (Ni—W/Y-MTW, Alu) and a catalyst in prior art (Ni—W/Y-BEA 150, Alu)

FIG. 5 shows a diagram which represents the gas oil density as a function of the yield of naphtha and gas (wt % 150° C.) for a catalyst according to the invention (Ni—W/Y-MTW, alu) compared to a catalyst in prior art (Ni—WNY-BEA 150, alu).

Compared with the density of the liquid total product, the density of the gas oil fraction produced by Ni—W/Y-BEA150, alu remains nearly constant. This means that nearly no saturation of the aromatic compounds took place. The reactivity of Y-BEA150 catalyst is defined by the BEA component, i.e., by the side-chain hydrocracking of substituted aromatic compounds and paraffins. These reactions influence the density of the gas oil fraction only to a very small amount. A high selectivity, i.e. ring-opening of saturated aromatic compounds and mild hydrocracking with a restricted side-chain cracking was observed with the catalyst composition Ni—W/Y-MTW, alu according to the invention.

Figure 6:
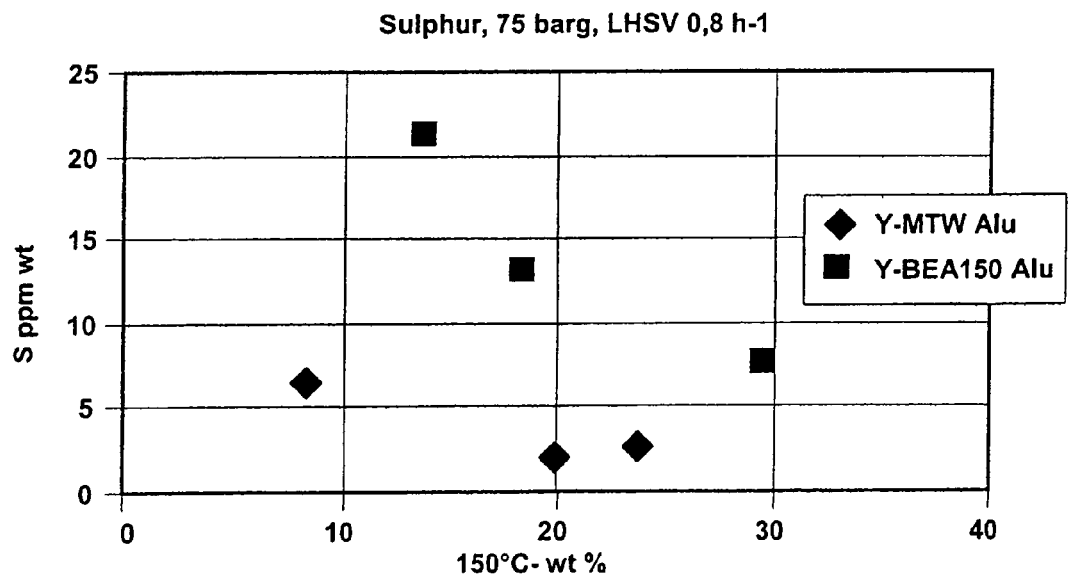
FIG. 6 is a diagram for the desulphurisation activity of a catalyst according to the invention (Y-MTW, Alu) with respect to a catalyst in prior art (Y-BEA150, Alu)

FIG. 6 shows a diagram for the desulphurization activity (hydrodesulphurization, HDS) of a catalyst according to the invention (Y-MTW, alu) compared to a catalyst of the prior art (Y-BEA150, alu) with a sulphur content of S=2557 wtppm as a function of the yield of naphtha and gas (wt % 150° C.).

The diagram shows that a very good hydrodesulphurization was obtained with a combination of a commercially available HDS catalyst with Ni—W/Y-MTW, alu with respect to the sulphur content in the gas oil fraction which is below 10 wtppm together with a limited formation of light products (<10 wt %). This results in a high desulphurization rate of 99.8%. In the case of the catalyst according to the prior art, Ni—W/Y-BEA150, alu, together with the commercially available HDS catalyst, the criterion of a sulphur content of below 10 wtppm is only obtainable in combination with a higher yield (>25 wt % on naphtha and gas).

Figure 7:
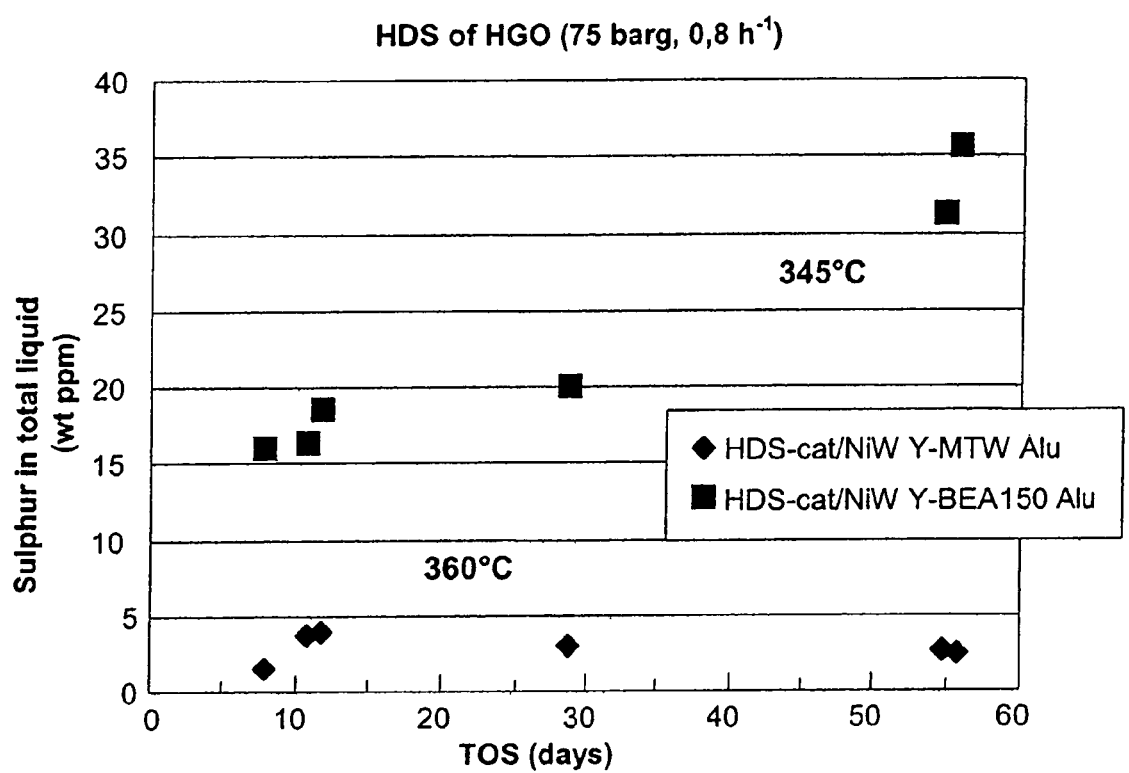
FIG. 7 is a diagram which shows the sulphur content and the liquid total product as a function of the test time (TOS).

FIG. 7 shows a diagram where the sulphur content in the liquid total product is shown as a function of the test period time on stream (TOS).

The HDS stability of the catalysts according to the invention Ni—W/Y-MTW, alu is very good. A de-activation was not observed during the entire test period. The catalyst of the prior art Ni—W/Y-BEA 150, alu, however, showed a continuous deactivation.

EXAMPLE 4

One Step Ring Opening

Heavy gas oil from a light North Sea Crude was ring opened at a temperature 350° C., pressure 75 barg, hydrogen to oil ratio of 800 Nl/l and under varying LHSV in the presence of the Catalyst of Example 3 (i.e. a Ni—W/Y-MTW with a commercially available Ni—W hydrotreating catalyst.

The feed had the following characteristics:

|  | Method | Unit | HGO |
| --- | --- | --- | --- |
| Density | D-4052 | kg/l | 0.8867 |
| Nitrogen | D-4629 | Ppm | 250 |
| Sulfur | D-5453 | Ppm | 2884 |
| Aromatics - mono | IP391 | wt % | 17.7 |
| Aromatics - di | IP391 | wt % | 8.6 |
| Aromatics - tri | IP391 | wt % | 3.8 |
| Atomatics - total | IP391 | wt % | 30.1 |
| CI | D-4737/90 |  | 55.6 |
| IBP | D-86 | ° C. | 286 |

-continued

|  | Method | Unit | HGO |
|---|---|---|---|
| 5% Recovered | D86 | °C. | 31.1 |
| 10% Recovered | D86 | °C. | 322 |
| 20% Recovered | D86 | °C. | 335 |
| 30% Recovered | D86 | °C. | 343 |
| 40% Recovered | D86 | °C. | 351 |
| 50% Recovered | D86 | °C. | 358 |
| 60% Recovered | D86 | °C. | 364 |
| 70% Recovered | D86 | °C. | 371 |
| 80% Recovered | D86 | °C. | 379 |
| 90% Recovered | D86 | °C. | 391 |
| 95% Recovered | D86 | °C. | 403 |
| FBP | D86 | °C. | 405 |

Figure 8:
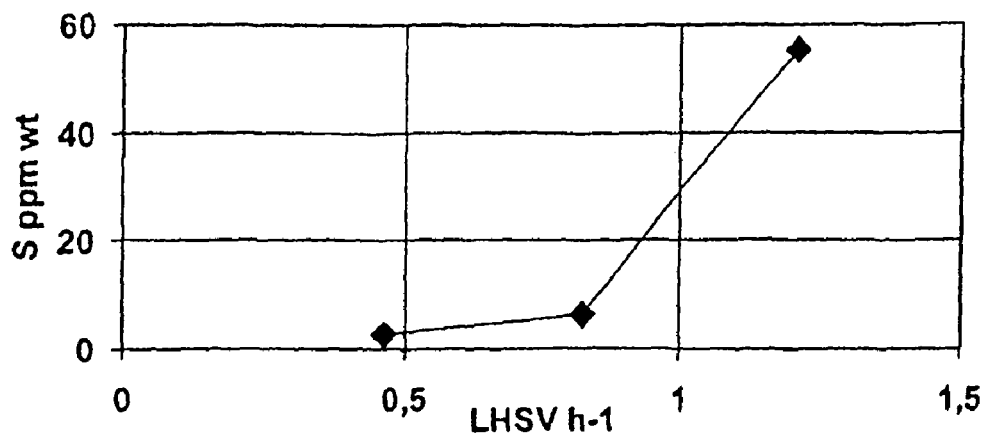
FIG. 8 is a diagram which shows the sulphur content of the hydrocracked and ring opened gas oil as a function of LHSV for a catalyst of the invention.

FIG. 8 shows a diagram which shows the sulphur content of the cracked product as a function of LHSV. At LHSV's of less than 1.0/h, sulphur content is less than 10 ppm.

EXAMPLE 5

One Step Ring Opening

The heavy gas oil feed of Example 4 was ring opened at a pressure of 75 barg, a hydrogen to oil ratio of 800 Nl/l and a LHSV of 0.8/h in the presence of the catalyst of example 3.

Figure 9:
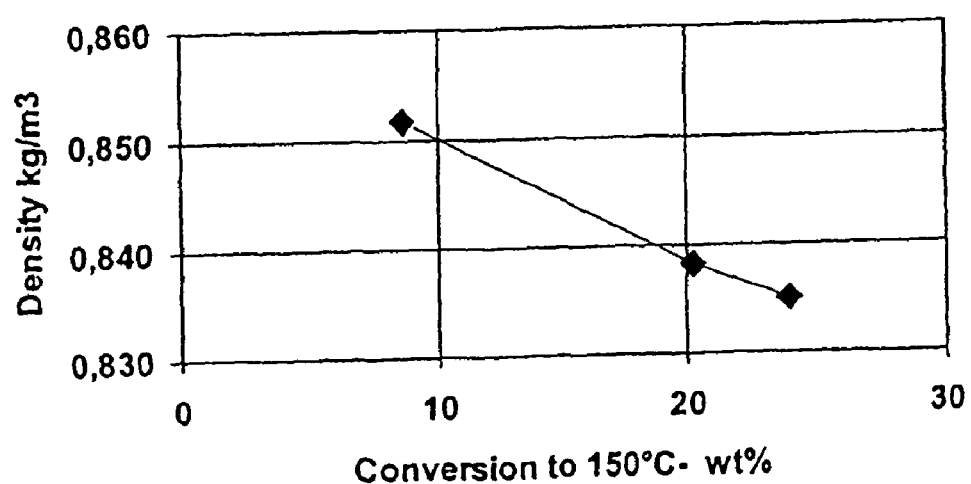
FIG. 9 is a diagram which shows the density of the total liquid product from hydrocracking as a function of the conversion of gas and naphtha for a catalyst of the invention.

In FIG. 9, the density of the ring opened gas oil product is depicted as a function of the conversion, i.e. the yield of (naphtha+gas) at the various temperatures employed. It is clearly shown that it is possible to satisfy the automotive diesel specification of less than 0.845 kg/m$^3$. The aim of the conversion is a significant lowering of the gas oil density in order to make the starting material employed (feed) accessible to use as a diesel fuel without too large a quantity of light products (naphtha and C1-C4 gases) being formed during the conversion. This aim is achieved with the catalysts according to the invention. By the combined hydrogenation of aromatics and subsequent ring-opening reaction in the case of the catalysts according to the invention, a significant lowering of the gas oil density is achieved, without the content of light naphtha increasing too greatly.

Figure 10:
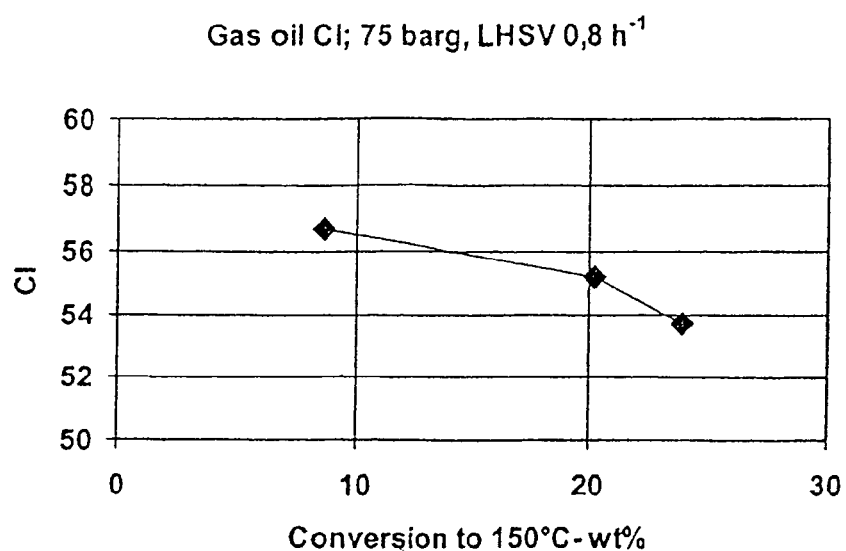
FIG. 10 is a diagram which shows the cetane index (CI) of the hydrocracked and ring opened gas oil as a function of conversion (gas+naphtha) for a catalyst of the invention.

In FIG. 10, the cetane index of the ring opened product is depicted as a function of the yield of naphtha and gases. The obtained cetane index is far above the minimum 51 requirement.

EXAMPLE 6

One Step Ring Opening

Figure 11:
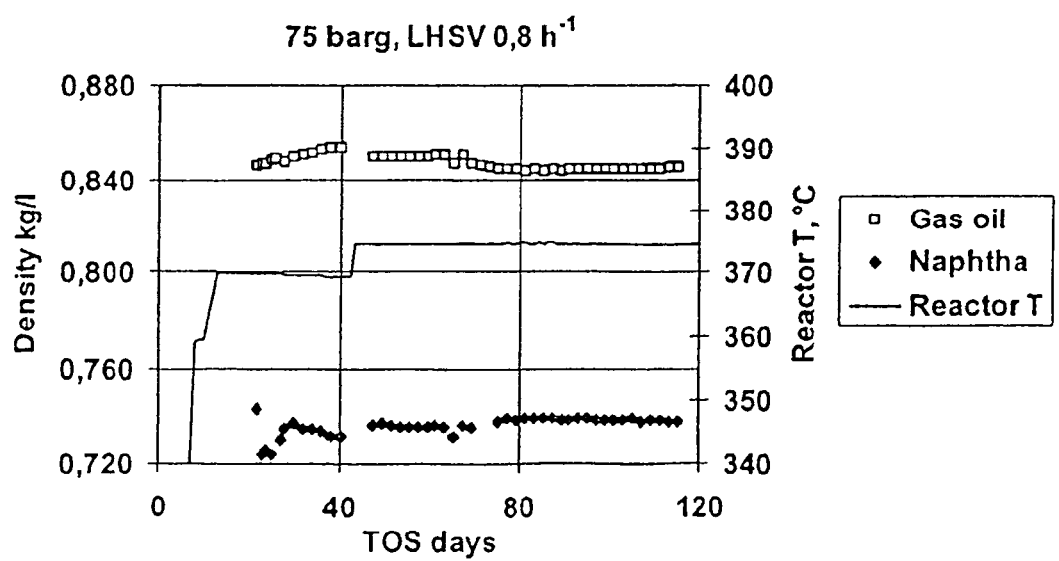
FIG. 11 is a diagram which shows the catalyst stability, i.e. the naphtha and gas oil densities as a function of test time (TOS) for a catalyst of the invention.

The heavy gas oil feedstock of Example 4 was ring opened at a pressure of 75 barg, a hydrogen to oil ratio of 800 Nl/l and a LHSV of 0.8/h in the presence of the catalyst of example 3. The temperature in the reactor was varied as shown in FIG. 11. The ring opening process was conducted for approximately 115 days in order to confirm catalyst stability.

FIG. 11 shows a diagram in which the density of the gas oil and naphtha fractions are shown as a function of the test duration (TOS) in order to demonstrate the stability of the catalyst of the invention. The thin line represents the reactor temperature over the course of the experiment. Deactivation of the catalyst of example 3 is not observed since the obtained densities are constant.

Figure 12:
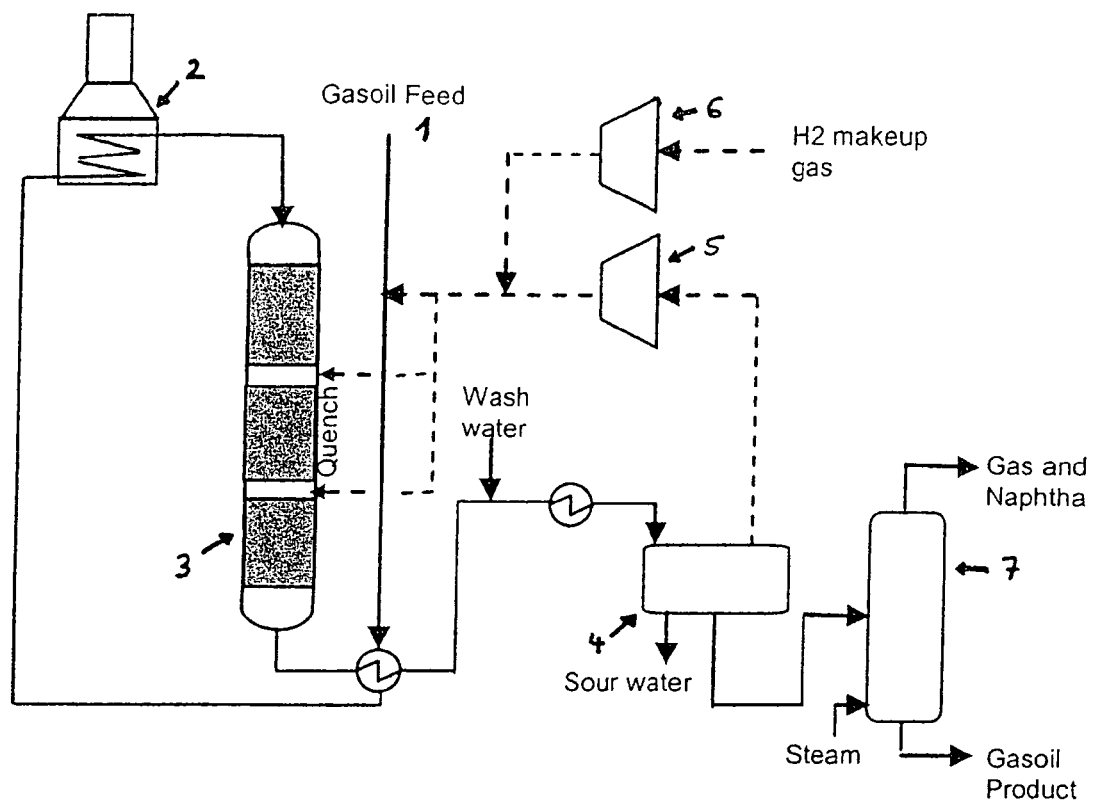
FIG. 12 is a diagram showing a potential process set up for the mild hydrocracking and ring opening process of the invention.

FIG. 12 shows a suitable reactor set up. Gasoil feed (1) is mixed with hydrogen rich treat gas and preheated to reactor inlet temperature by heat exchange with the reactor effluent stream and by a fired heater (2). The reactor feed reacts over the catalyst in the reactor (3) and the temperature increases through the reactor. The produced exotherm can be quenched by introduction of quench gas between the catalyst beds if desired. The reactor effluent is cooled and mixed with wash water before further cooling by air cooler or other heat exchange, to the required separator temperature. In the separator (4), sour water, liquid and gas are separated. Sour water is routed to the sour water system, the gas is recycled to the reactor via the recycle gas compressor (5) and after mixing with fresh H$_2$ makeup from makeup compressor (6), and the liquid is sent to the product stripper (7). In the stripper the light products, that is, gas and naphtha, are sent overhead of the column and the gasoil product is taken out as the bottom product. The gas is sent to H$_2$S recovery, the naphtha to further processing or to product tankage, and the gasoil product is sent to product tankage.

The invention claimed is:

1. A single stage process for desulfurization and ring opening of a sulphur containing hydrocarbon feedstock comprising:
    contacting said feedstock with hydrogen and a catalyst at a pressure of less than 100 barg to produce a ring opened product, wherein said catalyst comprises
        (I) a combination of molecular sieves consisting of at least one zeolite which has a faujasite structure and at least one a fibrous zeolite which substantially comprises non-crossing one-dimensional channels selected from the group consisting of; and
        (II) a composition comprising at least one metal selected from group VIB of the periodic table and at least one metal from group VIII.

2. The process of claim 1, wherein the zeolite with the faujasite structure and/or the fibrous zeolite are at least partially in the H-form.

3. The process of claim 1, wherein the channels of the fibrous zeolite have at least eight-ring-channels.

4. The process of claim 1, wherein said catalyst further comprises a binder.

5. The process of claim 4, wherein the binder is an aluminum compound.

6. The process of claim 1, wherein said at least one metal from group VIB of the periodic table and at least one metal from group VIII are in the form of their oxides, sulphates, nitrates, complex compounds or organic metal salts.

7. The process of claim 1, wherein the catalyst comprises a nickel compound and a tungsten or molybdenum compound.

8. The process of claim 7, wherein the nickel compound is present in an amount of 1 to 10 weight-% and the tungsten or molybdenum component in an amount of 2 to 30 weight-% with respect to the total weight of the catalyst.

9. The process of claim 1, wherein said feedstock comprises light gas oil, heavy gas oil, a vacuum distillate, vacuum gas oil, coker gas oil, or light cycle oil.

10. The process of claim 9, wherein said feedstock comprises heavy or light gas oil.

11. The process of claim 10, wherein said feedstock comprises straight run heavy gas oil.

12. The process of claim 1, wherein the boiling point of the hydrocarbon feedstock is in the range from 150 to 550° C.

13. The process of claim 1, wherein the density of the hydrocarbon feedstock is greater than 845 kg/m$^3$.

14. The process of claim 13, wherein the density of the ring opened product is less than 845 kg/m$^3$.

15. The process of claim 1, wherein the feedstock has a sulphur content of at least 1000 ppm (by weight).

16. The process of claim 1, wherein the ring opened product has a sulphur content of less than 20 ppm (by weight).

17. The process of claim 1, wherein said ring opening process is carried out at a temperature in the range from 350 to 400° C.

18. The process of claim 1, wherein said ring opening process is carried out at a pressure of 10 to 100 barg.

19. The process of claim 1, wherein said ring opening process is carried out at a LHSV of less than 1/h.

20. The process of claim 1, wherein 95% of the ring opened product has a boiling point of less than 395° C.

21. The process of claim 1, wherein the ring opened product, after any fraction having a boiling point below 150° C. has been removed, has a cetane number of at least 51.

22. The process of claim 1, wherein the density of the ring opened product is 25 kg/m$^3$ less than that of the feedstock.

23. The process of claim 1, wherein the density of the ring opened product, after any fraction having a boiling point below 150° C. has been removed is at least 25 kg/m$^3$ less than the feedstock.

24. The process of claim 1, wherein an amount of monoaromatics in the ring opened product is reduced to less than 15 wt%, an amount of diaromatics is reduced to less than 2 wt% and an amount of triaromatics is reduced to less than 0.5 wt%.

25. The process of claim 1, wherein an amount of naphtha component (i.e. liquid components boiling below 150° C.) produced during the process is less than 15% wt of the ring opened product.

26. The process of claim 25, wherein the yield of hydrocarbon gases is less than 5 wt%.

* * * * *